United States Patent
Uchida et al.

(10) Patent No.: US 6,849,341 B1
(45) Date of Patent: Feb. 1, 2005

(54) FORMED ARTICLE FROM HYDRAULIC COMPOSITION

(75) Inventors: Kiyohiko Uchida, Funabashi (JP); Hiroo Ushioda, Funabashi (JP); Satoshi Ozawa, Chiba (JP); Yasuhiko Shimada, Matsudo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 19 days.

(21) Appl. No.: 10/030,859

(22) PCT Filed: Jul. 12, 2000

(86) PCT No.: PCT/JP00/04684

§ 371 (c)(1),
(2), (4) Date: Jan. 10, 2002

(87) PCT Pub. No.: WO01/04071

PCT Pub. Date: Jan. 18, 2001

(30) Foreign Application Priority Data

Jul. 13, 1999 (JP) .......................................... 11/199006
Jul. 13, 1999 (JP) .......................................... 11/199009

(51) Int. Cl.$^7$ ......................... B32B 13/02; B32B 13/06; B32B 15/04
(52) U.S. Cl. ....................... 428/450; 428/454; 428/457; 428/461; 428/463
(58) Field of Search ................................ 428/457, 454, 428/461, 463, 450; 427/585, 250

(56) References Cited

U.S. PATENT DOCUMENTS

| | | | | |
|---|---|---|---|---|
| 4,560,413 A | * | 12/1985 | Takagi et al. | ................ 106/120 |
| 4,923,665 A | * | 5/1990 | Andersen et al. | ............ 264/259 |
| 5,534,292 A | * | 7/1996 | Mitsuo | ........................ 427/228 |
| 5,578,668 A | * | 11/1996 | Colombet et al. | ............ 524/265 |
| 5,753,036 A | * | 5/1998 | Hornaman et al. | ........... 106/810 |

FOREIGN PATENT DOCUMENTS

| | | | |
|---|---|---|---|
| EP | 0607073 | 7/1994 | |
| JP | 62197368 A | * 9/1987 | ............. B41C/1/04 |
| JP | 1119577 | 5/1989 | |
| JP | 5254906 | 10/1993 | |
| JP | 6234558 | 8/1994 | |
| JP | 700474653 | 2/1995 | |
| JP | 7109157 | 4/1995 | |
| JP | 7109163 | 4/1995 | |
| JP | 834683 | 2/1996 | |

OTHER PUBLICATIONS

Minoru Tokumoto, "Porimaa konnyuu semento" [Cement incorporating polymers], Feb. 1, 1995, Koubunshi Kankoukai KK, Kyoto, pp. 26–27 (English translation).

* cited by examiner

Primary Examiner—Monique R. Jackson
(74) Attorney, Agent, or Firm—Wood, Phillips, Katz, Clark & Mortimer

(57) ABSTRACT

It is an object of the present invention to provide moldings of hydraulic composition derived from hydraulic composition, to which both mechanical workability and wear resistance are simultaneously imparted, thereby achieving the applicability to a portion or part for which wear resistance is required, and ease of molding and shaping. According to the present invention, the molding of hydraulic composition prepared by press-molding a hydraulic composition, which comprises a hydraulic powder, a non-hydraulic powder having an average particle diameter of 1/10 or less of that of the hydraulic powder and a workability improver, to form a molded product, then curing the molded product to form a cured product, and then providing one of a metallic coating and a metallic compound coating on the cured product.

9 Claims, 1 Drawing Sheet

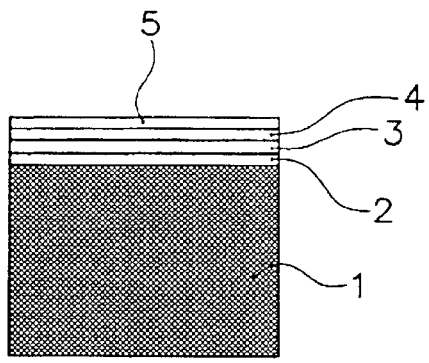

1 : CURED PRODUCT OF HYDRAULIC COMPOSITION
2 : CATALYST LAYER (PALLADIUM)
3 : ELECTROLESS NICKEL LAYER
4 : NICKEL LAYER (FIRST LAYER)
5 : NICKEL LAYER (SECOND LAYER)

FIG. 1

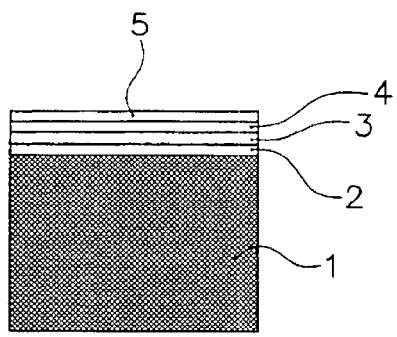

1 : CURED PRODUCT OF HYDRAULIC COMPOSITION
2 : CATALYST LAYER (PALLADIUM)
3 : ELECTROLESS NICKEL LAYER
4 : NICKEL LAYER (FIRST LAYER)
5 : NICKEL LAYER (SECOND LAYER)

FIG. 2

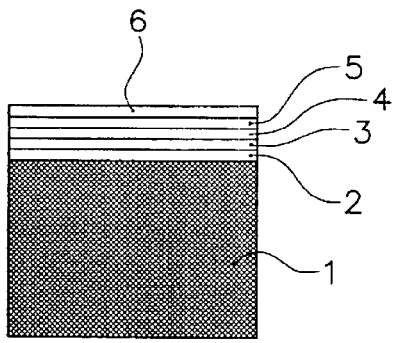

1 : CURED PRODUCT OF HYDRAULIC COMPOSITION
2 : CATALYST LAYER (PALLADIUM)
3 : ELECTROLESS NICKEL LAYER
4 : NICKEL LAYER (FIRST LAYER)
5 : NICKEL LAYER (SECOND LAYER)
6 : HARD CHROME LAYER

FIG. 3

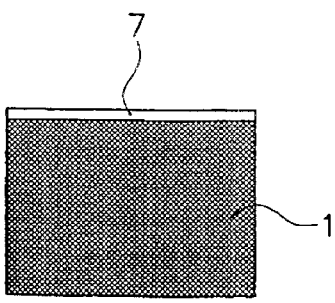

1 : CURED PRODUCT OF HYDRAULIC COMPOSITION
7 : $Al_2O_3$ plus $TiO_2$ layer

FORMED ARTICLE FROM HYDRAULIC COMPOSITION

FIELD OF THE INVENTION

This invention relates to moldings of hydraulic composition.

BACKGROUND OF THE INVENTION

Hitherto, metallic materials are broadly used as materials for mechanical parts due to their various excellent material characteristics. In these years, needs for mechanical parts are increasing as a result of advances in technologies. Specifically, mechanical parts using sintered ceramics, plastics or any other nonmetal materials are frequently used to cover shortcomings of metallic materials.

However, it is a current circumstance that conventional materials hardly cope with all of various needs in the progress of the technical innovation. Accordingly, there exists a demand for materials applicable to mechanical parts having novel characteristics.

In order to satisfy those demands, new materials are continuously developed. Under this trend, various techniques for forming a high-strength cured product by a hydraulic composition for the application to mechanical parts are proposed. For example, Japanese Patent Application Laid-open No. Sho-61-215239 discloses ultrahigh-strength mortar and concrete formed by a composition containing as main constituents a cementitious substance and ultrafine powder, high-range water reducing agent, water and aggregate. Japanese Patent Application Laid-open No. Sho-62-52157 discloses a high-strength cured product derived from the introduction of metallic particles into a cementitious admixture. Japanese Patent Application Laid-open No. Hei-03-137047 discloses a combined material of a cementitious substance and polymer. However, these cementitious cured products have yet put into practical use due to their poor strength and workability.

In order to address those problems, the present inventors made various studies and found that a molding produced by using a hydraulic composition resulted from the combination of a hydraulic powder, non-hydraulic powders having an average particle diameter of $1/10$ or less of that of the hydraulic powder, workability improver, moldability improver and the like possess exhibits an excellent property achieving the applicability to sheet-feeding rollers or any other mechanical parts. Consequently, they filed a patent application (Japanese Patent Application Nos. Hei-11-28137, and Hei-11-59310).

However, cured products of those hydraulic compositions must further improve the surface hardness for the application to mechanical parts requiring a higher wear resistance. Needs to mechanical parts are not only for wear resistance, but also for improved electric conductivity, magnetic property, electromagnetic wave shielding property, heat shielding property, and other various properties. Consequently, conventional moldings of hydraulic composition hardly satisfy these needs.

SUMMARY OF THE INVENTION

It is an object of the present invention to provide a molding of hydraulic composition that is capable of being applied to a portion or part requiring wear resistance and easily be molded and machined by imparting both mechanical workability and wear resistance to a cured product derived from a hydraulic composition.

It is another object of the present invention to impart electric conductivity, electromagnetic wave shielding property, optical property, heat shielding property, decorability or the like to the molding derived from the hydraulic composition.

The present inventors made intensive studies to achieve the above objects and found that a molding produced by press-molding a hydraulic composition (A) derived from a mixture of mixed powders comprised of a hydraulic powder and a non-hydraulic powder having an average particle diameter of $1/10$ or less of that of the hydraulic powder and a workability improver and then curing the resultant possesses an excellent workability, dimensional resistance and other properties; the molding can be imparted with both excellent mechanical workability and wear resistance by forming a plated layer on a surface of the molding; and the molding can also be imparted with electric conductivity, magnetic property, electromagnetic wave shielding property, heat shielding property, or other various properties by properly selecting the type of plated coating to be formed on the molding. Consequently, the present invention has been achieved.

Specifically, according to the present invention, there is provided a molding of hydraulic composition prepared by press-molding a hydraulic composition, which comprises a hydraulic powder, a non-hydraulic powder having an average particle diameter of $1/10$ or less of that of the hydraulic powder and a workability improver, to form a molded product, then curing the molded product to form a cured product, and then providing one of a metallic coating and a metallic compound coating on the cured product.

The hydraulic composition of the molding preferably comprises 100 wt. part of a powdered mixture that contains 50–90 wt. % of the hydraulic powder and 10–50 wt. % of the non-hydraulic powder having an average particle diameter of $1/10$ or less of that of the hydraulic powder, and 2–18 wt. part of the workability improver.

The workability improver in the molding of hydraulic composition is preferably at least one selected from the group consisting of vinyl acetate resin, vinyl acetate acrylate copolymer resin, vinyl acetate-Veova copolymer resin, vinyl acetate maleate copolymer resin, vinyl acetate ethylene copolymer resin, vinyl acetate-ethylene-vinyl chloride copolymer resin, acrylic copolymer resin, acrylic-styrene copolymer resin, acrylic-silicone copolymer resin, vinyl acetate-Veova ternary copolymer resin and epoxy resin.

The one of the metallic coating and the metallic compound coating is preferably formed by wet plating, spray plating, vacuum deposition, sputtering, chemical vapor deposition, ion plating or activated reactive evaporation process.

The molding used for the molding of hydraulic composition may be cured by natural curing, steam curing or autoclaving curing process.

The present inventors found that a hydraulic composition (B) containing a hydraulic powder, a non-hydraulic powder having an average particle diameter of $1/10$ or less of that of the hydraulic powder, a moldability improver, a workability improver and a viscosity improver possesses an excellent extrusion molding property; a molding produced by subjecting the hydraulic composition (B) to the extrusion-molding and subsequently the curing process possesses an excellent workability, dimensional resistance and the like; the molding can be imparted with an improved wear resistance in addition to the excellent machinability by forming a metallic coating or metallic compound coating on a surface of the molding; and the molding can also be imparted with electric conductivity, magnetic property, electromagnetic wave shielding property, heat shielding property, or other various properties by properly selecting the type of metallic coating or the metallic compound coating to be formed on the molding. Consequently, the present invention has been achieved.

Specifically, according to the present invention, there is provided a molding of hydraulic composition prepared by extruding a hydraulic composition, which comprises a hydraulic powder, a non-hydraulic powder having an average particle diameter of 1/10 or less of that of the hydraulic powder, a moldability improver, a workability improver and a viscosity improver, to form an extruded product, then curing the extruded product to form a cured product, and then providing one of a metallic coating and a metallic compound coating on the cured product.

The hydraulic composition preferably comprises 100 wt. part of a powdered mixture that contains 40–80 wt. % of the hydraulic powder, 10–50 wt. % of the non-hydraulic powder having an average particle diameter of 1/10 or less of that of the hydraulic powder and 10–20 wt. % of the moldability improver, 2–9 wt. part of the workability improver, and 0.5–5 wt. part of the viscosity improver.

The workability improver in the molding of the hydraulic composition may be at least one selected from the group consisting of vinyl acetate resin, vinyl acetate acrylate copolymer resin, vinyl acetate-Veova copolymer resin, vinyl acetate maleate copolymer resin, vinyl acetate ethylene copolymer resin, vinyl acetate-ethylene-vinyl chloride copolymer resin, acrylic copolymer resin, acrylic-styrene copolymer resin, acrylic-silicone copolymer resin, vinyl acetate-Veova ternary copolymer resin and epoxy resin.

The moldability improver in the molding of hydraulic composition may be talc.

One of the metallic coating and the metallic compound coating in the molding of hydraulic composition may be formed by wet plating, spray plating, vacuum deposition, sputtering, chemical vapor deposition, ion plating or activated reactive evaporation process.

The molding used for the molding of hydraulic composition may be cured by natural curing, steam curing or autoclaving curing process.

As a hydraulic composition for manufacturing a molding, the composition (A) that contains the hydraulic powder, the non-hydraulic powder and the workability improver, or the composition (B) that contains the hydraulic powder, the non-hydraulic powder, the moldability improver, the workability improver and the viscosity improver is used in the present invention.

The description will be hereinafter made for a method of manufacturing moldings based upon various components used in each composition and the respective compositions.

Hydraulic Composition (1) Hydraulic powder:

The hydraulic powder used in the present invention is meant to be a powder that is capable of curing by contact with water, illustrative examples of which include a powder of a member selected from calcium silicate, calcium aluminate, calcium fluoroaluminate, calcium sulphoaluminate, calcium aluminoferrite, phosphate calcium, hemihydrate gypsum or anhydride gypsum, or calcium oxide possessing a self-hardening property, or a mixed powder of at least two members selected from them. As a representative example of it, it can be cited a powdered member such as Portland cement. It is possible to solely use one type of the hydraulic powder or use the admixture of two or more types of the hydraulic powders.

The hydraulic powder preferably has an average particle diameter of about 10–40 $\mu$m, and has a specific surface area by blaine of 2500 $cm^2$/g or more to secure the hydration performance for the strength of the molding.

The content of the hydraulic powder in the case of (A) is preferably set in the range of about 50–90 wt. % and more preferably about 65–75 wt. % with the total content of the hydraulic powder and the non-hydraulic powder as being 100 wt. %. The content of the hydraulic powder in the case of (B) is preferably set in the range of about 40–80 wt. % and more preferably about 45–55 wt. % with the total content of the hydraulic powder, the non-hydraulic powder and the moldability improver as being 100 wt. %. Where the content of the hydraulic powder is excessively small, the strength, filling ratio or the like of the resultant molding will be degraded. On the other hand, where the content of the hydraulic powder is excessively large, the filling ratio required for producing the molding will be degraded. Moldings produced from the compositions in both cases are not suitable since they are unlikely to be tolerable against machining stress and may pose any other problems.

(2) Non-hydraulic powder:

The non-hydraulic powder used in the present invention is meant to be a powder that is incapable of curing by itself even by contact with water and include a powder that has components eluted therefrom in alkaline or acid state, or under high-pressure steam atmosphere and then reacted with other eluted components, thereby generating a matter. Illustrative examples of the non-hydraulic powder include powdered potassium hydroxide, dihydrate gypsum, calcium carbonate, slag, flyash, silica, clay and silica fume. It is possible to solely use one type of the non-hydraulic powder or use the admixture of two or more types of the non-hydraulic powders.

The non-hydraulic powder must have an average particle diameter of 1/10 or less and preferably of 1/100 or less of that of the hydraulic powder. The lower limit of the particle diameter is not necessarily set, but may be varied in such a range as not to ruin the effects of the present invention. In usual application, it is preferable to employ an average particle diameter of about 1/500 or more of the hydraulic powder, since the average particle diameter of less than this value lowers the flowability, and hence deteriorate the moldability. The use of the non-hydraulic powder having such a particle diameter can enhance the filling ratio for forming the molding, reduce the void ratio of the resultant molding and hence improve the dimensional resistance of the same.

The content of the non-hydraulic powder in the case of (A) is preferably set in the range of about 10–50 wt. % and more preferably about 25–35 wt. % with the total content of the hydraulic powder and the non-hydraulic powder as being 100 wt. %. The content of the non-hydraulic powder in the case of (B) is preferably set in the range of about 10–50 wt. % and more preferably about 20–30 wt. % with the total content of the hydraulic powder, the non-hydraulic powder and the moldability improver as being 100 wt. %. Where the content of the non-hydraulic powder is excessively small, the filling ratio will be degraded. On the other hand, where the content of the non-hydraulic powder is excessively large, the strength and the filling ratio will be degraded, and the molding's solid state properties after molding and subsequent curing processes in both cases will be undesirably affected. That is, the molding may be chipped off or the dimensional resistance may be undesirably affected. Considering the mechanical strength, it is preferable to adjust the content of the non-hydraulic powder so as not to excessively lower the filling ratio.

(3) Moldability improver:

The moldability improver used in the present invention is meant to be a material that is capable of improving the slippability between a molding die and a molding during forming the molding from the hydraulic composition by extrusion-molding, reducing the anisotropy of the molding, stabilizing the quality of the same, illustrative examples of which include talc (hydrated magnesium silicate), mica and other plate-like substances. These plate-like substances possess an excellent orientation property, so that they impart slippability on the surface of the molding, reduce the resistance with respect to a molding die, and hence achieve easy operation of the extrusion molding. They can also reduce the anisotropy on the quality of the molding, and stabilize the quality of the molding.

The content of the moldability improver is preferably set in the range of about 10–30 wt. % and more preferably about 15–25 wt. % with the total content of the hydraulic powder, the non-hydraulic powder and the moldability improver as being 100 wt. %. Where the content of the moldability improver is excessively small, the slippability of the molding will be lowered, causing increase in resistance to the molding die. Hence, the molding accuracy will be degraded. Additionally, the anisotropy of the molding will undesirably become great, which results in undesirable effects over the mechanical strength, dimensional resistance or other properties.

(4) Workability improver:

The workability improver is meant to be a material that possesses a property contributing to improvements in moldability, unmoldability, cutting/grinding property, grinding accuracy, or other properties, and more particularly a material effectively contributing to improvements in cutting/grinding property and grinding accuracy of the molding formed from the hydraulic composition.

According to the hydraulic composition containing such workability improver, the workability improver fulfills the function as a molding auxiliary agent during the press-molding operation, so that the moldability is improved. Also, the workability improver improves the fragile of a cement-type cured product, so that the resultant molding is unlikely to be damaged when removed from the die. Hence, the working efficiency is improved. The molding produced from the hydraulic composition which is a fragile material is easy to crack during the cutting operation, thereby posing problems of material cracking or chipping. Accordingly, the workability improver is mixed into the hydraulic composition, thereby imparting the resultant molding with toughness, which stimulates the machinability of the molding as a solid material, and hence successfully preventing the molding from cracking or chipping. Therefore, it is possible to improve the machinability of the resultant molding derived from the hydraulic composition, which is conventionally hard to be machined such as cut or ground, to the same level as a metallic material. As a result, the cutting by a lathe turning machine and grinding by a cylindrical grinding machine can be performed in nearly the same manner as a metallic material, allowing for precise machining of the molding required for having a predetermined size in $\mu$m order.

Illustrative examples of the workability improver applicable to the present invention include vinyl acetate resin, copolymer resin containing vinyl acetate, acrylate resin, copolymer resin containing acrylic monomer, styrene resin, copolymer resin containing styrene, and epoxy resin. As the copolymer resin containing vinyl acetate in these members, it can be cited vinyl acetate acrylate copolymer resin, vinyl acetate-Veova copolymer resin, vinyl acetate maleate copolymer resin, vinyl acetate ethylene copolymer resin, vinyl acetate-ethylene-vinyl chloride copolymer resin, and vinyl acetate-Veova ternary copolymer resin can be cited. As the copolymer resin containing acrylic monomer in those members, acrylic, vinyl chloride and vinyl acetate copolymer resin, acrylic-styrene copolymer resin, and acrylic-silicone copolymer resin can be cited. As the copolymer resin containing styrene, it can be cited styrene butadiene copolymer resin and the like. It is possible to solely use one type of the workability improver or use the admixture of two or more types of the workability improvers. The workability improver may be used in powder, emulsion or other form, and preferably has a single particle diameter of about 1 $\mu$m or less in usual application.

The content of the workability improver in the case (A) is preferably set as a solid content of the workability improver in the range of about 2–18 wt. part and more preferably about 5–15 wt. part with the total content of the hydraulic powder and the non-hydraulic powder as being 100 wt. part. Also, the content of the workability improver in the case (B) is preferably set as a solid content of the workability improver in the range of about 2–9 wt. part and more preferably about 6–8 wt. part with the total content of the hydraulic powder, the non-hydraulic powder and the moldability improver as being 100 wt. part. Where the content of the workability improver is excessively small, the cuttability will be degraded. On the other hand, where the content of the workability improver is excessively large, the grinding accuracy and dimensional resistance after the grinding will be undesirably lowered, although the moldability is improved.

(5) Viscosity improver:

The viscosity improver is meant to be a material that is capable of dissolving in water and hence develop the viscosity, and a component that is effective such as for enhancing particle-to-particle bonding between the hydraulic powder and the non-hydraulic powder, thereby preserving the shape of the resultant molding, retaining the water-holding capacity and producing a solid molding.

Illustrative examples of the viscosity improver usable in the present invention include methylcellulose, hydroxyethyl cellulose, and carboxymethyl cellulose. The quantity of the viscosity improver consumed is preferably about 0.5–5 wt. part and more preferably 3–4 wt. part with the total content of the hydraulic powder, the non-hydraulic powder and the moldability improver as being 100 wt. part. Where the content of the viscosity improver is excessively small, it is likely to cause cracks in an edge part of the excluded product, or rough surface or any other undesirable effects on the molding quality. On the other hand, where the content of the viscosity improver is excessively large, it is likely to increase shrinkage ratio, and degrade dimensional resistance of a product.

Method of Manufacturing a Molding (1) Molding Process

With respect to (A)

For manufacturing a molding by using the hydraulic composition (A), the aforesaid respective components are mixed with added water according to needs, and then the resultant is press-molded.

The content of water is preferably about 30 wt. part or less and more preferably 25 wt. part or less with the total content of the hydraulic powder and the non-hydraulic powder as being 100 wt. part. The content of water is preferably set as small as possible for decreasing drying shrinkage. Polymer emulsion usually exists a water dispersion having a concentration of about 40–50%. Accordingly, where the polymer emulsion is used as the workability improver, the content of water separately added is preferably set as small as possible since water present in the emulsion is mixed into each component. For example, where 18 wt. part of the polymer emulsion is added with the total content of the hydraulic powder and the non-hydraulic powder as being 100 wt. part, a sufficient amount of water to be added is about 10 wt. part. Where water is supplied from the outside of the molding during the curing process, a much smaller amount of water is sufficient.

The mixing process is not necessarily limited to a specific one, provided that the respective components of the hydraulic composition can be uniformly mixed together. Particularly, for uniformly mixing a composition containing the hydraulic powder and the non-hydraulic powder having an average particle diameter of $\frac{1}{10}$ or less of the hydraulic powder, it is preferable to employ a mixing process enabling application of high shearing force. For example, it is possible to employ a ribbon mixer, Henschel mixer, Eirich mixer and the like. A period of time required for the mixing can be shortened by using mixers of these types that can exert a high shearing force.

For imparting an excellent handling property to a mixture for the molding operation, the admixture may be granulated to a size suitable for a shape to be molded after the mixing. A conventional process such as a rolling granulating process, compression granulating process and stirring granulating process can be employed.

The hydraulic composition thus mixed is then filled into a molding die and press-molded into a predetermined shape. A molding process is not necessarily limited to a specific one. For example, isostatic pressing, multi-axial pressing, single-axial pressing and the like may be employed. As a pressing condition, a pressing force is preferably high enough to approximate as close to a calculated theoretical concentration as possible. Since the lower limit of the pressing force is varied according to a moldability of the mixture, water content ratio, required dimensional accuracy or the like, it may be properly determined based upon these conditions. The pressing force required for molding is usually in the range of about 0.5–1.5 ton/cm$^2$, and preferably about 0.8–1.2 ton/cm$^2$. Where the pressing force for molding is excessively low, the cured product is unlikely to be solidified, and therefore has a lowered mechanical strength. On the other hand, where the pressing force for molding is excessively high, the polymer emulsion is likely to flow from the inside of the molding, and therefore causes deteriorated solid state properties of a cured product. The excessively low and high pressing forces are therefore undesirable.

With respect to (B)

For manufacturing a molding by using the hydraulic composition (B), the aforesaid respective components are mixed with added water according to needs, and then the admixture is subjected to extrusion molding.

The content of water is preferably in the range of about 10–30 wt. part and more preferably about 20–25 wt. part with the total content of the hydraulic powder, the non-hydraulic powder and the moldability improver as being 100 wt. part. Where the content of water is excessively low, molding is hardly made, and it is likely to cause cracks or the like on the molding and deteriorate the mechanical properties of the molded and cured product. On the other hand, where the content of water is excessively large, retaining the shape of the molded product is hardly made, and it is likely to cause shrinkage of the molded cured product and deteriorate the dimensional resistance. Thus, excessively low and high water contents are undesirable.

The mixing process is not necessarily limited to a specific one, provided that the respective components of the hydraulic composition can be uniformly mixed together. Particularly, for uniformly mixing a composition containing the hydraulic powder and the non-hydraulic powder having an average particle diameter of $\frac{1}{10}$ or less of the hydraulic powder, it is preferable to employ a mixing process providing for high shearing force such as by kneading the composition with a kneader or the like. A period of time required for the mixing can be shortened by using a mixer of the type exerting a high shearing force.

For imparting an excellent handling property to an admixture for molding operation, the admixture may be granulated to a size suitable for a shape to be molded after the mixing. As a granulating process, a conventional process such as the rolling granulating process, compression granulating process and stirring granulating process can be employed.

The hydraulic composition having the aforementioned specific content ratio of each component possesses an excellent extrusion molding property, allowing itself to be easily extruded into a molding having a predetermined shape by following a conventional process.

As an example of the extrusion molding process, it may employ a process including throwing the mixed and kneaded material by a kneader in an extruder, and extruding the material under an extrusion pressure of 30 kg/cm$^2$ –100 kg/cm$^2$ while deaerating it by a vacuum pump.

(2) Curing Process

The molding formed in the above manner is then removed from the molding die and then cured for such a period of time as to allow the molding to have a sufficient strength. The curing may be made by leaving the molding at a room temperature. Alternatively, it is possible to employ steam-curing or other process. Among various processes, the molding is preferably cured in an autoclave. Where the content of water for forming the cured product is lacking or insufficient, the steam curing process is preferably carried out.

The autoclaving curing is preferably carried out under a saturated vapor pressure of 7.15 kg/cm$^2$ or higher and at a temperature of 165° C. or higher, and more preferably under a saturated vapor pressure of 9.10 kg/cm$^2$ or higher. The curing time depends on a curing temperature. For example, where the curing is conducted at 175° C., the curing may continue for about 5–15 hours. It is preferable that the compression strength is raised to about 5N/mm$^2$ or more, after finishing the molding and before starting the autoclaving curing. The case where a sufficient strength has not yet been developed until the start of the autoclaving curing is not preferable since there may cause explosion of the molding during the autoclaving.

The steam curing may be conducted for 10–24 hours at a temperature of about 60° C.

The molding produced in the above manner possesses an excellent moldability, unmoldability, cutting property, grinding property, grinding accuracy or other properties, allowing the molding itself to be easily molded and formed into various shapes by machining. According to the present invention, a metallic coating or metallic compound coating is formed on a surface of the thus formed molding, thereby improving the surface hardness of the molding, and hence imparting the wear resistance to the molding. Also, it is possible to impart electromagnetic wave shielding property, optical property, heat shielding property, decorability or the like to the molding according to the type of a coating to be formed.

The forming process of the metallic coating or the metallic compound coating is not necessarily limited to a specific one, and therefore a conventional forming process can be applied. As an example of such forming processes, it can be cited wet plating, spray plating, vacuum deposition, sputtering, chemical vapor deposition, ion plating, activated reactive evaporation process (ARE process) or the like.

The metallic coating or metallic compound coating may be formed in the usual manner according to a process employed. The type of a coating also is not necessarily limited to a specific one, and therefore may be properly selected from metallic coatings or metallic compound coatings formable by conventional processes according to an intended purpose. As an example of the metallic compound coating, it can be cited a metal oxide, metal nitride, metal carbide or metal boride coating. The thickness of a coating is also not limited to a specific one, and therefore may be properly varied according to an intended purpose.

Where a plated coating is made by the wet plating process, the process is such that the electroless plating is conducted to impart electric conductivity to the surface of the molding of hydraulic composition, and then electroplating is conducted.

The electroless plating may be conducted as following the usual manner. For example, a sensitizer-activator process, catalyst process or any other conventional process may be conducted to apply catalyst for electroless plating to the surface of the molding and form an electroless-plated coating by using a conventional electroless plating solution such as an electroless copper plating solution and electroless nickel plating solution. The thickness of an electroless plated coating is not necessarily limited to a specific one. For example, in order to impart a proper electric conductivity, the thickness may be in the range of about 0.2–0.5 $\mu$m.

Then, a plated coating is formed by the electroplating process. The type of an electroplating solution is not necessarily limited to a specific one, and therefore may be properly selected from conventional electroplating solutions according to an intended purpose. For example, it is possible to use a nickel plating solution, copper plating solution.

Since the electroless plated coating is usually thinner, it is preferable to avoid the electroplating conducted at a blast and a high current density. According to a preferable example, a copper plated coating or nickel plated coating having a thickness of 1–3 $\mu$m is formed as a primer plating at a relatively low current density such as that of about 0.5 A/dm$^2$, and a nickel plated coating or the like having a thickness of about 5–20 $\mu$m is preferably formed on the primer plating. According to needs, a chrome plated coating having a thickness of about 5–20 $\mu$m may be formed as an outermost layer.

The metallic composition coating such as metal oxide, metal nitride, metal carbide, metal boride coating may be formed by spraying process such as flame spray, plasma spray, explosion spray coating process, following conventional conditions.

The molding of hydraulic composition of the present invention having the metallic coating or metallic composition coating has a relatively high surface hardness with respect to a conventional hydraulic composition, so that it possesses an excellent wear resistance. Also, the molding possesses an excellent moldability, unmoldability, cutting property, grinding property, grinding accuracy or other properties, allowing the molding itself to be easily molded and formed into various shapes by machining. Also, it is possible to impart electric conductivity, electromagnetic wave shielding property, optical property, heat shielding property, decorability or the like to the molding by properly selecting the type of a coating. The molding is also applicable to parts of electronic devices.

Thus, according to the present invention, it is possible to manufacture a molding of hydraulic composition that is applicable to a part requiring the wear resistance, and possesses various properties such as electric conductivity, electromagnetic wave shielding property, optical property, heat shielding property and decorability in a cheap manner.

BRIEF DESCRIPTION OF THE DRAWINGS

FIG. 1 is a cross section of a molding with a nickel plated coating formed thereon according to a first embodiment.

FIG. 2 is a cross section of a molding with a nickel plated coating and a chrome plated coating formed thereon according to a second embodiment.

FIG. 3 is a cross section of a molding with a coating layer made of an admixture of $Al_2O_3$ and $TiO_2$ according to a third embodiment.

BEST MODE FOR CARRYING OUT THE INVENTION

Now, the description will be made for the present invention based upon the respective embodiments.

(First Embodiment)

FIG. 1 is a cross section of a molding of hydraulic composition with a plated coating formed thereon according to the present invention, in which reference numerals 1, 2, 3, 4 and 5 respectively represent a molding of hydraulic composition, a catalyst layer (palladium), a nickel layer formed by the electroless plating process, a primer nickel plated layer formed by the electroplating process, and a nickel plated layer formed by the electroplating process. The method of manufacturing the cured product will be hereinafter described.

With respect to (A)

20–30 wt. part of water was added to the hydraulic composition (A) containing 70 wt. part of Portland cement as the hydraulic powder (average particle diameter of about 15 $\mu$m), 30 wt. part of silica fume as the non-hydraulic powder (average particle diameter of about 0.2 $\mu$m) and 10 wt. part of acrylate resin as the workability improver, and mixed therewith by using a Henschel mixer.

The admixture was then filled in a molding die and press-molded by using a press molding machine under a molding pressure of 500 kg/cm$^2$, so that a molding having a size of 30×50×500 mm was produced. This molding was then unmolded and heated to 175° C. and 9.1 atmospheric pressure at a programming rate of 50° C./hour, then held for 7 hours at 175° C. and 9.1 atmospheric pressure, and returned to atmospheric pressure in 3 hours by the autoclaving curing process. After the curing, the resultant was cut into a piece having a width of 10 mm. Thus, a molding 1A having a size of 30×30×10 mm was produced.

With respect to (B)

20–30 wt. part of water was added to the hydraulic composition (B) containing 80 wt. part of Portland cement as the hydraulic powder (average particle diameter of about 15 $\mu$m), 10 wt. part of silica fume as the non-hydraulic powder (average particle diameter of about 0.2 $\mu$m), 10 wt. part of talc as the moldability improver, 10 wt. part of acrylate resin as the workability improver and 2 wt. part of carboxymethyl cellulose as the viscosity improver, and mixed therewith by using a kneader.

The admixture was then molded into a piece having a size of 30×30×500 mm by an extrusion molding machine at a pressure of 10 kg/cm² while deaerating the admixture by a vacuum pump, then heated to 175° C. and 9.1 atmospheric pressure at a programming rate of 50° C./hour, then held for 7 hours at 175° C. and 9.1 atmospheric pressure, and returned to atmospheric pressure in 3 hours by the autoclaving curing process. The resultant was cut into a piece having a width of 10 mm. Thus, a molding 1B having a size of 30×30×10 mm was produced.

The moldings 1A and 1B were immersed in a catalyzer solution as a solution for the electroless plating for 5 minutes at a room temperature by using a catalyzer (a solution of the admixture of tin ions and palladium ions), then rinsed, and then immersed in a sulphuric acid solution, so that palladium 2 as a catalytic substance for the electroless nickel plating was applied on a surface portion (30×30 mm) of each of the moldings 1A and 1B.

Then, the moldings 1A and 1B were immersed in a electroless nickel plating bath (a solution containing nickel sulphate, sodium citrate, sodium hypophosphite and ammonia) at 30° C. for 5 minutes. Thus, an electroless nickel layer 3 having a thickness of 0.5 μm was formed on a surface of each of the moldings 1A and 1B.

Subsequently, a primer nickel plated layer 4 having a thickness of 2 μm was formed on a surface of each of the moldings 1A and 1B by conducting the electro-nickel plating process at a cathode current density of 0.5 A/dm² by using an electro-nickel plating solution (a solution containing nickel sulphate, nickel chloride and boric acid), and a nickel plated layer 5 having a thickness of 15 μm was formed thereon by conducting the electro-nickel plating process at a cathode current density of 1 A/dm² by using the same electro-nickel plating solution.

(Second Embodiment)

In the same manner as the first embodiment, the moldings of hydraulic composition 1A and 1B each were provided thereon with the palladium catalyst layer 2, the electroless nickel layer 3, the primer nickel plated layer 4 by the electroplating process, and the nickel plated layer 5 by the electroplating process.

Then, a hard chrome layer 6 having a thickness of 20 μm was formed on the nickel plated surface of each of the moldings by conducting the plating at a solution temperature of 60° C. and a cathode current density of 50 A/dm² for 10 minutes by using a chrome plating solution (175 g/l of chromic acid and 0.7 g/l of sulphuric acid).

FIG. 2 illustrates a cross section of the thus produced molding.

(Third Embodiment)

The moldings of hydraulic composition 1A and 1B were produced in the same manner as the first embodiment. Then, a coating layer 7 made of a mixture of Al₂O₃ and TiO₂ was formed on each of the moldings by the explosion spray coating process.

The thus formed coating layer was an oxide coating having a thickness of 200 μm, a melting point of 1700° C. or higher and the weight % ratio of Al₂O₃ to TiO₂ of 4 to 1.

FIG. 3 is a cross section of the thus produced molding.

Surface hardness test:

The surface hardness for each of the moldings produced in the first to third embodiments was measured by the Vickers hardness test, and the measured results are shown in Table 1. As a comparative example, the surface hardness for a molding with no plated coating formed thereon is also shown in Table 1.

TABLE 1

| | SURFACE TREATING PROCESS | SURFACE HARDNESS (HV) [MOLDING 1A] | SURFACE HARDNESS (HV) [MOLDING 1B] |
|---|---|---|---|
| EMBODIMENT 1 | NICKEL PLATING | 525 | 520 |
| EMBODIMENT 2 | NICKEL PLATING plus CHROME PLATING | 900 | 940 |
| EMBODIMENT 3 | Al₂O₃ plus TiO₂ | 1250 | 1150 |
| COMPARATIVE EXAMPLE | NO TREATMENT | 50 | 40 |

What is claimed is:

1. A molding of hydraulic composition prepared by press-molding a hydraulic composition, which comprises a hydraulic powder, a non-hydraulic powder having an average particle diameter of 1/10 or less of that of the hydraulic powder and a workability improver, to form a molded product while having a compression strength set at 5 N/mm² or more, then curing the molded product by an autoclaving curing process under a saturated vapor pressure of 7.15 kg/cm² or higher and at a temperature of 165° C. or higher to form a cured product, then applying catalyst for electroless plating to the surface of the cured product, then forming an electroless-plated coating thereon, and then providing a metallic coating on the cured product by an electroplating process.

2. The molding of hydraulic composition according to claim 1, wherein said hydraulic composition comprises 100 wt. part of a powdered mixture and 2–18 wt. part of the workability improver, said powdered mixture containing 50–90 wt. % of the hydraulic powder and 10–50 wt. % of the non-hydraulic powder having an average particle diameter of 1/10 or less of that of the hydraulic powder.

3. The molding of hydraulic composition according to claim 1, wherein said workability improver is at least one selected from the group consisting of vinyl acetate resin, vinyl acetate acrylate copolymer resin, vinyl acetate-Veova copolymer resin, vinyl acetate maleate copolymer resin, vinyl acetate ethylene copolymer resin, vinyl acetate-ethylene-vinyl chloride copolymer resin, acrylic copolymer resin, acrylic-styrene copolymer resin, acrylic-silicone copolymer resin, vinyl acetate-Veova ternary copolymer resin and epoxy resin.

4. A molding of hydraulic composition prepared by extruding a hydraulic composition, which comprises a hydraulic powder, a non-hydraulic powder having an average particle diameter of 1/10 or less of that of the hydraulic powder, a moldability improver, a workability improver and a viscosity improver, to form an extruded product while having a compression strength set at 5 N/mm² or more, then curing the extruded product by an autoclaving curing process under a saturated vapor pressure of 7.15 kg/cm² or higher and at a temperature of 165° C. or higher to form a cured product, then applying catalyst for electroless plating to the surface of the cured product, then forming an electroless-plated coating thereon, and then providing a metalliccoating on the cured product by an electroplating process.

5. The molding of hydraulic composition according to claim 4, wherein the hydraulic composition comprises 100 wt. part of a powdered mixture, 2–9 wt. part of the workability improver, and 0.5–5 wt. part of the viscosity improver, the powdered mixture containing 40–80 wt. % of the hydraulic powder, 10–50 wt. % of the non-hydraulic powder having an average particle diameter of 1/10 or less of that of the hydraulic powder and 10–20 wt. % of the moldability improver, 2–9 wt. part of the workability improver.

6. The molding of hydraulic composition according to claim 4, wherein the workability improver is at least one selected from the group consisting of vinyl acetate resin, vinyl acetate acrylate copolymer resin, vinyl acetate-Veova copolymer resin, vinyl acetate maleate copolymer resin, vinyl acetate ethylene copolymer resin, vinyl acetate-ethylene-vinyl chloride copolymer resin, acrylic copolymer resin, acrylic-styrene copolymer resin, acrylic-silicone copolymer resin, vinyl acetate-Veova ternary copolymer resin and epoxy resin.

7. The molding of hydraulic composition according to claim 4, wherein the moldability improver is talc.

8. A molding of hydraulic composition prepared by press-molding a hydraulic composition, which comprises a hydraulic powder, a non-hydraulic powder having an average particle diameter of 1/10 or less of that of the hydraulic powder and a workability improver, to form an extruded product while having a compression strength set at 5 N/mm$^2$ or more, then curing the molded product by an autoclaving curing process under a saturated vapor pressure of 7.15 kg/cm$^2$ or higher and at a temperature of 165° C. or higher to form a cured product, and then providing a metallic compound coating on the cured product by a spraying process.

9. A molding of hydraulic composition prepared by extruding a hydraulic composition, which comprises a hydraulic powder, a non-hydraulic powder having an average particle diameter of 1/10 or less of that of the hydraulic powder, a moldability improver, a workability improver and a viscosity improver to form an extruded product while having a compression strength set at 5 N/mm$^2$ or more, then curing the excluded product by an autoclaving curing process under a saturated vapor pressure of 7.15 kg/cm$^2$ or higher and at a temperature of 165° C. or higher to form a cured product, and then providing a metallic compound coating on the cured product by a spraying process.

* * * * *